(12) United States Patent
Körte

(10) Patent No.: US 6,696,553 B1
(45) Date of Patent: Feb. 24, 2004

(54) ANTHRAQUINONE-AZO DYES AND USE OF SUCH COMPOUNDS

(75) Inventor: Klaus Körte, Ettingen (CH)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

(21) Appl. No.: 09/979,766

(22) PCT Filed: May 24, 2000

(86) PCT No.: PCT/IB00/00691

§ 371 (c)(1),
(2), (4) Date: Nov. 16, 2001

(87) PCT Pub. No.: WO00/71622

PCT Pub. Date: Nov. 30, 2000

(30) Foreign Application Priority Data

May 25, 1999 (EP) .............................. 99810449

(51) Int. Cl.[7] .......................... C09B 56/12; C09D 11/02; C08K 5/23

(52) U.S. Cl. ........................... 534/654; 534/655; 8/506; 8/522; 8/676; 106/31.44

(58) Field of Search ................................ 534/654, 655; 8/522, 506, 676; 106/31.44

(56) References Cited

U.S. PATENT DOCUMENTS 2,145,954 A * 2/1939 Semple et al. ............... 534/654
3,865,543 A * 2/1975 Schlafer et al. ................ 8/676

FOREIGN PATENT DOCUMENTS

GB 1296857 * 11/1972
GB 2032941 * 5/1980

* cited by examiner

Primary Examiner—Fiona T. Powers
(74) Attorney, Agent, or Firm—Scott E. Hanf

(57) ABSTRACT

Water-soluble dyes of the formula

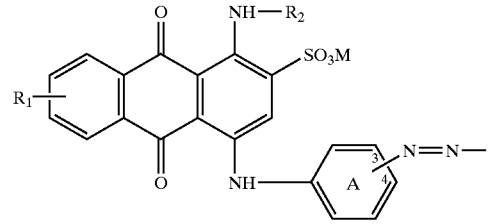

(I), in which
- $R_1$ is hydrogen, hydroxyl, $C_{1-4}$-alkyl, $C_{1-4}$-alkoxy, halogen or $SO_3M$,
- $R_2$ is hydrogen, $C_{1-4}$-alkyl or $C_{3-6}$-cycloalkyl,
- B is the radical of a carbocyclic, heterocyclic or methylene-active non-cyclic coupling component having at least two optionally fused carbocyclic rings, and
- M is hydrogen or a non-chromophoric cation,
- the ring A has no further substituents or is substituted with from one to four of the following substituents: $C_{1-4}$-alkyl, $C_{1-4}$-alkoxy, halogen, $-NO_2$, $-COOM$ and, $-SO_3M$, and the group $-N=N-B$ is bonded to position 3 or 4 of the ring A, with the proviso that the molecule contains at least two $-SO_3M$ groups, are suitable for dyeing or colouring non-fibrous substrates, in particular anodized aluminium or water-soluble plastic compositions.

18 Claims, No Drawings

ANTHRAQUINONE-AZO DYES AND USE OF SUCH COMPOUNDS

In GB-A-478665, in U.S. Pat. No. 2,108,126 and in DE-A-1914192 there are described dyes of the anthraquinone series containing a radical of aminoazobenizene linked over the amino group to the 4position of 1-aminoanthraquinone-2-sulphonic acid and where the phenylazo group may bear a sulpho group, for the dyeing of textile fibers. Typically there is described the dye of formula

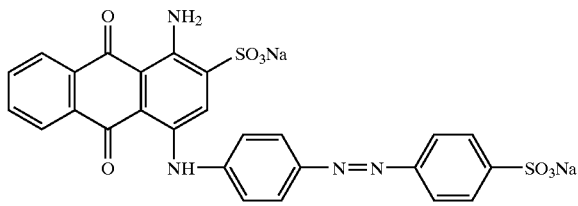

in Example 1 of U.S. Pat. No. 2,108,126 for the dyeing of wool, in Example 4 of GB-A-478665 (Complete Specification) for the dyeing of cotton and wool and in Example 1 of DE-A-1914192 for dyeing textile fabrics of polyamide fibers (polyamide 6) or polyurethane fibers. In Example 4 of DE-A-1914192 there is further described the dye of formula

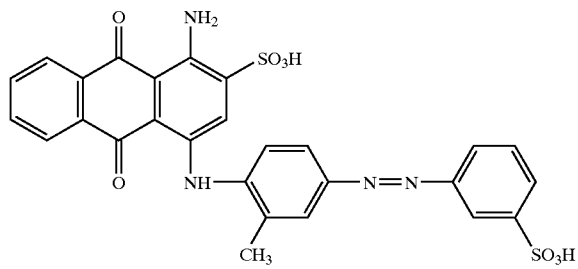

for dyeing textile fabrics of polyamide fibers (polyamide 66).

U.S. Pat. No. 3,202,550 relates to the dyeing of aluminium oxide layers with dyes containing phosphonate, arsonate or stibonate groups. The mentioned and described dyes are of most various categories, e.g. phithalocyanine, monoazo, disazo, aniline, anthraquinone, naphthalimide, quinoline, triphenylmethane and azo copper complex dyes, and in one of the examples (Example 35) there is described the anthraquinone dye of formula

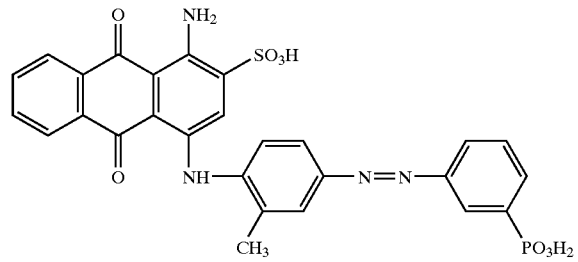

Dyes not containing these phosphonate, arsonate or stibonate groups are stated in U.S. Pat. No. 3,202,550 to be disadvantageous in the dyeing of aluminium oxide layers, due to loss of affinity of the dye in the presence of the usual salts used in the dyeing of aluminium oxide layers In the above azo-anthraquinone dyes the sulphophenyl or phosphonophenyl radicals are radicals of diazo components.

It has now surprisingly been found that the anionic anthraquinone azo dyes below are not only particularly suitable for the dyeing of oxide layers on metal surfaces, especially oil aluminium, but are also particularly suitable for colouring other non-fibrous substrates, such as plastic compositions and coatings, or free-flowing bulk materials.

The invention relates to the use of the defined dyes for colouring non-fibrous substrates, to the novel dyes and their production and use, and to corresponding dye preparations and their use.

A first subject-matter of the invention is thus the use of water-soluble dyes of the formula

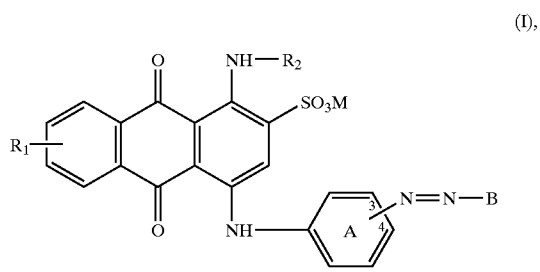

(I), in which $R_1$ is hydrogen, hydroxyl, $C_{1-4}$-alkyl $C_{1-4}$-alkoxy, halogen or $SO_3M$.

$R_2$ is hydrogen, $C_{1-4}$-alkyl or $C_{3-6}$-cycloalkyl,

B is the radical of a carbocyclic, heterocyclic or methylene-active non-cyclic coupling component having at most two optionally fused carbocyclic rings, and M is hydrogen or a non-chromophoric cation, the ring A has no further substituents or is substituted with from one to four of the following substituents: $C_{1-4}$-alkyl, $C_{1-4}$-alkoxy, halogen, —$NO_2$, —COOM and —$SO_3M$, and the group —N═N—B is bonded to position 3 or 4 of the ring A, with the proviso that the molecule contains at least two —$SO_3M$ groups, for dyeing or colouring non-fibrous substrates.

The anthraquinone azo dyes of the formula (I) can be produced in a manner known per se by diazotization, coupling and condensation reactions. The process for the production of the compounds of the formula (I) is, in particular, characterized in that the diazo compound of at least one amine of the formula

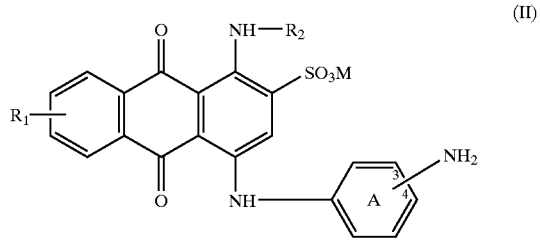

(II)

is coupled to at least one coupling component of the formula

H—B (III)

or a compound of the formula

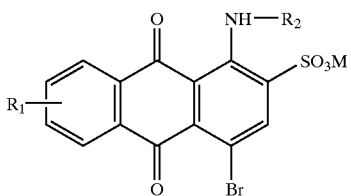
(IV)

is reacted with a compound of the formula

(V)

The compounds of the formulae (II) to (V) are known or can be produced by methods known per se. The compounds of the formula (V) can, in particular, be produced by a process in which the diazo compound of an amine of the formula

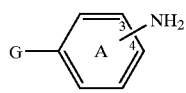
(VI)

in which G is a nitro group or a primary amino group protected by acylation, is coupled to a coupling component H—B, and, when the coupling is complete, either the nitro group G is reduced to a primary amino group or the amino group G protected by acylation (preferably acetylation) is hydrolyzed to the primary amino group.

The said reactions (diazotization, coupling, condensation, reduction and hydrolysis) can be carried out in a manner known per se.

The diazotization of the amines of the formula (II) or (VI) can be carried out in a manner known per se. in particular with sodium nitrite in acidic medium (for example pH 1 to 3) and at low temperature, for example in the range from −5 to +15° C. The coupling of the diazonium compound to a coupling component of the formula H—B can be carried out in a manner known per se, advantageously at temperatures in the range from −5 to +30° C., preferably below 25° C., particularly preferably in the range from 0 to 10° C., and, depending on the coupling component H—B, under acidic to clearly alkaline conditions, for example in the pH range from 3 to 12, preferably from 4 to 11. The reactions can be carried out in aqueous medium or also in aqueous/organic medium, where the organic medium is preferably a water-miscible inert solvent (for example an alcohol or dioxane).

The reaction of a compound of the formula (IV) with a compound of the formula (V) is a condensation which takes place under dehydrobrominating conditions. It advantageously takes place in aqueous medium in the presence of a base, for example an alkali metal hydroxide or carbonate, in particular in the presence of sodium hydroxide or carbonate, and at elevated temperature, for example in the range from 40 to 100° C.

The reduction of a nitro group G expediently takes place under mild conditions, for example with a sulphide, hydrazine or sulphite or by the Béchamps method; the hydrolysis of an acylated amino group G expediently likewise takes place under mild conditions, for example at temperatures in the range from 30 to 80° C. and in the pH range from 8 to 10.

The dyes of the formula (I) are essentially purely anionic dyes, in particular they are free from cationic or fiber-reactive substituents, i.e. in particular —B is free from such substituents.

Halogen stands, for example, for fluorine, chlorine or bromine, preferably for chlorine.

Of the $C_{1-4}$-alkyl and -alkoxy groups, the low-molecular-weight ones are preferred, principally methyl, ethyl, methoxy and ethoxy.

If $R_1$ is chlorine or a sulpho group, it is preferably in one of positions 6 and 7 of the anthraquinone ring.

$R_1$ preferably stands for hydrogen or a sulpho group;

$R_2$ advantageously stands for methyl, ethyl or particularly preferably hydrogen.

Of the up to four possible further substituents on the ring A, advantageously at most two are electro-negative substituents (—$NO_2$, —COOM, —$SO_3M$). The ring A preferably carries a total of at most two further substituents of those mentioned above, preferably a sulpho group and optionally a further substituent, which is advantageously a methyl, ethyl, methoxy, carboxyl, hydroxyl or sulpho group. If the ring A carries a sulpho group, this is advantageously in the ortho- or preferably meta-position to the NH group; further substituents can be located in one or more of the available positions on the ring A.

The radical B is the radical of a coupling component H—B as defined above. B is preferably the radical of a coupling component $HB_1$, $HB_2$, $HB_3$ or $HB_4$, in which $HB_1$ is a methylene-active, non-cyclic coupling component in which any carbocyclic rings that may be present are unsubstituted or are substituted with one or more of the substituents $C_{1-4}$-alkyl, $C_{1-4}$-alkoxy, halogen and —$SO_3M$;

$HB_2$ is a methylene-active, carbocyclic non-aromatic coupling component;

$HB_3$ is a heterocyclic coupling component in which any carbocyclic ring that may be present is unsubstituted or is substituted with one or more of the substituents $C_{1-4}$-alkyl, $C_{1-4}$-alkoxy. halogen and —$SO_3M$; and $HB_4$ is a coupling component of the formula

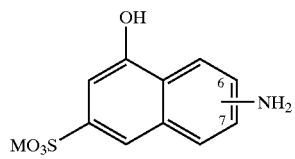

in which the amino group is bonded to position 6 or 7 of the naphthalene radical.

Preferred coupling components $HB_1$ are, in particular, those which contain two carbonyl groups or two nitrile groups or one carbonyl group and one nitrile group bonded to a methylene $CH_2$, in particular those which, in one of their tautomeric forms, conform to the formulae (α)

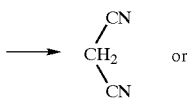 or (β),

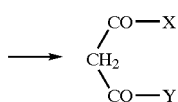

in which

X signifies $C_{1-4}$-alkyl, —$OR_3$, —$NR_4R_5$, phenyl which is optionally substituted with halogen. $C_{1-4}$-alkoxy, —$SO_3M$ or $C_{1-4}$-alkyl, phenyl-$C_{1-4}$-alkyl which is optionally substituted on the ring with halogen, $C_{1-4}$-alkoxy or —$SO_3M$, or sulphomethyl, Y signifies —$OR_3$, $C_{1-4}$-alkyl, phenyl which is optionally substituted with halogen. $C_{1-4}$-alkoxy, $C_{1-4}$-alkyl or —$SO_3M$, phenyl-$C_{1-4}$-alkyl which is optionally substituted on the ring with halogen, $C_{1-4}$-alkoxy or —$SO_3M$, or —$NR_4R_5$, $R_3$ signifies $C_{1-8}$-alkyl, phenyl or phenyl-($C_{1-4}$-alkyl) whose phenyl radical is unsubstituted or substituted with 1–3 of the substituents halogen, $C_{1-4}$-alkyl, $C_{1-4}$-alkoxy, —COOM and —$SO_3M$, $R_4$ signifies hydrogen or $C_{1-4}$-alkyl and $R_5$ signifies hydrogen, $C_{1-10}$-alkyl, $C_{5-6}$-cycloalkyl, phenyl or phenyl-($C_{1-4}$-alkyl) whose phenyl radical contains no further substituents or is further substituted with 1–3 substituents from the series halogen, hydroxyl, $C_{1-4}$-alkyl, $C_{1-4}$-alkoxy, —COOM and —$SO_3M$, or a 1- or 2-naphthyl radical carrying one to three —$SO_3M$ groups, Preferred coupling components $HB_2$ are, in particular, those which contain in one ring two oxo groups in meta-position to each other, in particular those which, in one of their tautomeric forms, conform to the formulae (γ)

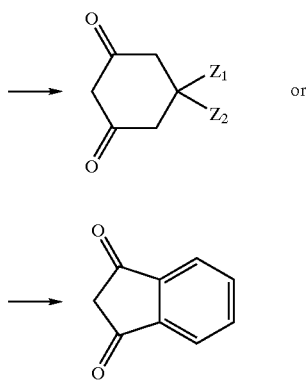

in which $Z_1$ and $Z_2$, independently of one another, signify hydrogen or $C_{1-4}$-alkyl.

Preferred coupling components $HB_3$ are, in particular, five- or six-membered heterocyclic compounds which contain at least one nitrogen atom, preferably one or two nitrogen atoms, as heteroatoms and carry at least one activating substituent, for example hydroxyl, oxo or amino, in the adjacent position to a nitrogen and to the coupling position, in particular those which, in one of their tautomeric forms, in each case conform to the formulae (ε),

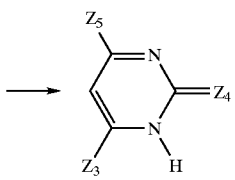

(ζ)

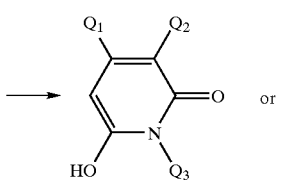

(η),

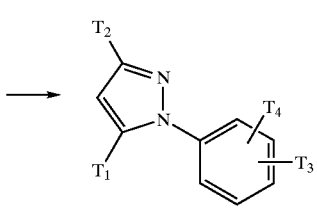

in which $Z_3$ signifies —OH, —$NH_2$, methyl or ethyl, $Z_4$ signifies =O, =S, =NH or =N—CN, $Z_5$ signifies —OH or —$NH_2$, $Q_1$ signifies $C_{1-4}$-alkyl, —$CH_2$—$SO_3M$, —COOM or phenyl, Which optionally carries an —$SO_3M$ group, $Q_2$ signifies hydrogen, —$CH_2$—$SO_3M$, cyano, —$CONH_2$, —$SO_3M$, or $C_{1-4}$-alkyl which is optionally monosubstituted with hydroxyl, halogen, cyano, $C_{1-4}$-alkoxy, —$SO_3M$ or —$OSO_3M$, $Q_3$ signifies hydrogen, $C_{1-6}$-alkyl, substituted $C_{1-6}$-alkyl, cyclohexyl, phenyl or phenyl-($C_{1-4}$-alkyl), $T_1$ signifies —OH or —$NH_2$, $T_2$ signifies $C_{1-2}$-alkyl, phenyl, sulphomethyl or —COOM, $T_3$ signifies hydrogen, chlorine, $C_{1-4}$-alkyl, $C_{1-4}$-alkoxy or —$SO_3M$ and $T_4$ signifies hydrogen, $C_{1-4}$-alkyl, $C_{1-4}$-alkoxy or —$SO_3M$, and in which the arrow indicates the coupling position.

Of the $C_{1-4}$-alkyl and -alkoxy groups, the low-molecular-weight ones are preferred, principally methyl, ethyl, methoxy and ethoxy.

The $C_{3-10}$-alkyl groups can be linear or branched.

The $C_{3-4}$-alkoxy groups can be linear or branched.

M may stand for hydrogen or a non-chromophoric cation. Hydrogen as ion is in the form of the hydronium ion. As non-chromophoric cations, alkali metal cations, ammonium cations and alkalinic earth metal cations, for example, come into consideration. As alkaline earth metal cations, calciuim and magnesium, for example, may be mentioned. As ammonium cations, unsubstituted ammonium or ammonium ions of low-molecular-weight amines may be mentioned, for example mono-, di- or tri-$C_{1-2}$-alkyl- and/or -β-hydroxy-$C_{2-3}$-alkyl-ammonium, for example mono-, di- or tri-isopropanol-ammonium, mono-, di- or tri-ethanolammonium and N-methyl-N-ethanolammonium. As alkali metal cations, conventional cations of this type come into consideration, for example lithium, sodium and/or potassium ions. Of the said cations, the alkali metal cations and ammonium cations are preferred. According to one embodiment of the invention, a part of the symbols M stands for hydrogen and the remaining part thereof stands for alkali metal and/or ammonium cations.

The compounds of the formula (I) contain, apart from the sulpho group in the 2-position on tile anthraquinone ring, at least one further sulpho group, principally one to four further sulpho groups. Advantageously, one or two sulpho groups are located on the ring A, and any remaining are located in B and/or one thereof on the anthraquinone ring as $R_1$, $R_2$ preferably stands for hydrogen, $R_1$ preferably stands for a sulpho group or for hydrogen.

B may contain one or two aromatic carbocyclic rings, i.e. one or two benzene rings, which are optionally fused, B preferably contains at most one benzene ring.

Of the coupling components H—B, particularly of the coupling components $HB_1$, $HB_2$, $HB_3$ and HB4, the open chain ones, or $HB_1$, and especially the heterocyclic ones, or $HB_3$, are preferred. Of the open chain coupling components, particularly of the coupling components $HB_3$, the bicarbonylic ones are preferred, especially the amidic ones, particularly those of the formula (β) in which one of X and Y signifies —$NR_4R_5$. Of the heterocyclic coupling components, particularly of the coupling components $HB_3$, the six-membered ones, particularly those of the formulae (ε) and especially (ζ), are preferred.

The dyes of the formula (I) are in general green to black or gray dyes and their solutions have pronounced light absorption maxima in the region of orange-coloured and violet to ultra-violet wavelengths, corresponding to the blue or yellow colour region of visible colour.

A further subject-matter of the invention is represented by those dyes of the formula (I) in which B signifies the radical of a coupling component $HB_1$, $HB_2$, $HB_3$ or $HB_4$, particularly of the formulae (α), (β), (γ), (δ), (ε), (ζ) or (η), and which may be produced by the above process, wherein in formulae (III) and (V) B is the radical of a coupling component $HB_1$, $HB_2$, $HB_3$ or $HB_4$.

The compounds of the formula (I) are used for dyeing non-fibrous substrates. "Non-fibrous substrates" here is taken to mean, in particular, any substrate which is not fiber-containing, especially such as artificially, in particular anodically generated oxide layers on aluminium or aluminium alloys, free-flowing bulk material, or even polymer-containing compositions or coatings. For the dyeing of oxide layers on aluminium or aluminium alloys, in particular those dyes of the formula (I) which contain from two to four sulpho groups, preferably from two to three sulpho groups, at least one of which is preferably on the ring A, are preferred. For the dyeing of polymer-containing coatings or compositions and free-flowing bulk material, in particular those dyes of the formula (I) which contain three or more sulpho groups, in particular from four to five sulpho groups, are preferred.

Aluminium alloys which principally come into consideration are those in which the aluminium content preponderates, especially alloys with magnesium, silicon, zinc and/or copper, for example Al/Mg, Al/Si, Al/Mg/Si, Al/Zn/Mg, Al/Cu/Mg and Al/Zn/Mg/Cu, preferably those in which the aluminium content makes up at least 90 percent by weight; the magnesium content is preferably ≦6 percent by weight; the silicon content is preferably ≦6 percent by weight; the zinc content is preferably ≦10 percent by weight; the copper content is advantageously ≦2 percent by weight, preferably ≦0.2 percent by weight.

The oxide layers formed on the metallic aluminium or on the aluminium alloys can have been generated by chemical oxidation or preferably by galvanic means by anodic oxidation. The anodic oxidation of the aluminium or of the aluminium alloy for passivation and formation of a porous layer can take place by known methods, using direct current and/or alternating current, and using electrolyte baths which are suitable in each case, for example with addition of sulphuric acid, oxalic acid, chiromic acid, citric acid or combinations of oxalic acid and chromic acid or sulphuric acid and oxalic acid. Such anodization methods are known in industry, for example the DS method (direct current; sulphuric acid), the DSX method (direct current; sulphuric acid with addition of oxalic acid), the DX method (direct current; oxalic acid), the DX method with addition of chromic acid, the AX method (alternating current; oxalic acid), the AX-DX method (oxalic acid, first alternating current then direct current), the AS method (alternating current; sulphuric acid) and the chromic acid method (direct current; chromic acid). The current voltages are, for example, in the range from 5 to 80 volts, preferably from 8 to 50 volts; the temperatures are, for example, in the range from 5 to 50° C.; the current density at the anode is, for example, in the range from 0.3 to 5 A/dm$^2$, preferably from 0.5 to 4 A/dm$^2$, where current densities as low as ≦2 A/dm$^2$ are generally suitable for generating a porous oxide layer; at higher voltages and current densities, for example in the range from 100 to 150 volts and ≧2 A/dm$^2$, particularly from 2 to 3 A/dm$^2$, and at temperatures up to 80° C., particularly hard and fine-pored oxide layers can be generated, for example by the "Ematal" method with oxalic acid in the presence of titanium salts and zirconium salts. In the production of oxide layers which are subsequently dyed electrolytically or directly by adsorptive methods with a dye of the formula (I), the voltage is, according to a preferred procedure which is conventional per se in practice, in the range from 12 to 20 volts; the current density here is preferably from 1 to 2 A/dm$^2$. These anodization methods are known in general terms in industry and are also described in detail in the specialist literature, for example in Ullmann's "Enzyklopädie der Technischen Chemie" [Encyclopedia of Industrial Chemistry], 4$^{th}$ Edition, Volume 12. pages 196 to 198, or in the Sandoz brochures "Sanodal®" (Sandoz AG, Basle, Switzerland, Publication No. 9083.00.89) or "Ratgeber für das Adsorptive Färben von Anodisiertem Aluminium" [Advice for the Adsorptive Dyeing of Anodized Aluminium] (Sandoz, Publication No. 9122.00.80). The layer thickness of the porous oxide layer is advantageously in the range from 2 to 35 μm, preferably from 2 to 25 μm. In the case of colour anodization, the thickness of the oxide layer is advantageously in the range from 5 to 60 μm, preferably from 10 to 40 μm. The dyes of the formula (I) are also suitable for thin oxide layers, for example those ≦10 μm, and for those which have been anodically dyed. If the anodized aluminium or the anodized aluminium alloy has been stored for a short time (for example 1 week or less) before the dyeing, it is advantageous to wet and/or to activate the substrate before the dyeing, for example by treatment with a non-reducing, aqueous mineral acid, for example with sulphuric acid or nitric acid. If desired, the oxide layer—analogously to the known "Sandalor®" method—can first be pre-dyed electrolytically, for example in a bronze shade, and subsequently over-dyed with a dye of the formula (I); in this way, particularly opaque shades are obtainable which are particularly suitable for use, for example, in external architecture. It is also possible for oxide layers pre-dyed by colour anodization (by the method known as integral dyeing) to be over-dyed with a dye of the formula (I); in this way, opaque shades which are particularly suitable, for example, for external architecture are likewise obtainable.

In the area of aluminium finishing, coloured, anodically generated oxide layers are becoming preferred thanks to their excellent protective action against mechanical and corrosive influences.

For the dyeing of the oxide layer with the dyes of the formula (I), use can be made of dyeing methods which are conventional per se, in particular adsorption methods, where the dye solution can be applied, for example, to the oxide surface, for example by spraying-on or by application with a roll (depending on the shape of the substrate), or preferably by immersing the object to be dyed into a dye bath. In accordance with one embodiment of the dyeing process according to the invention, the anodized metal objects can be treated with the dye bath after the anodic treatment and the rinsing in the same vessel in which the anodization has taken place, or, in accordance with a further embodiment, the objects to be dyed can be removed from the vessel after the anodic treatment and the rinsing and dyed in a second unit either directly or after drying and optional intermediate storage, where, if the objects have intermediately been stored, it is advisable to carry out an activation (for example by brief treatment with sulphuric acid or nitric acid) before the dying. It is noted in this respect that an) intermediate storage—if it takes place at all—preferably takes place for a restricted, short time, for example less than 1 week, particularly $\leq 2$ days. In accordance with preferred, generally conventional processes, dyeing is carried out immediately after anodization and subsequent rinsing.

The dyeing expediently takes place at temperatures below the boiling point of the liquor, advantageously at temperatures in the range from 15 to 80° C., preferably in the range from 20 to 75° C., particularly preferably from 20 to 60° C. The pH of the dyeing liquor is, for example, in the clearly acidic to weakly basic range, for example in the pH range from 3 to 8, where weakly acidic to nearly neutral conditions are preferred, in particular in the pH range from 4 to 6. The dye concentration and the dyeing duration can vary very greatly depending on the substrate and the desired dyeing effect. For example, suitable dye concentrations are in the range from 0.01 to 20 g/l, advantageously from 0.1 to 10 g/l, in particular from 0.2 to 2 g/l. The dyeing duration can be, for example, in the range from 20 seconds to 1 hour, advantageously from 5 to 40 minutes, very attractive, intense dyeings being obtainable at a dyeing duration of only from 5 to 30 minutes at dye concentrations, pH values and temperatures in the preferred ranges, on oxide layers having a thickness in the range from 5 to 25 $\mu$m. Since the dyes to be employed in accordance with the invention are very readily water-soluble, stock solutions or reinforcing liquors of any desired concentration can be produced therewith in order to establish or correct the dye concentration in the dye bath to whatever level, as required.

Prior to sealing, the dyed substrate is advantageously rinsed with water. For the sealing, any desired known methods which are conventional per se can be used, optionally with the aid of suitable additives. The sealing can be carried out, for example, in one or two stages, where, if proceeding in two stages, the first stage advantageously consists of a hot-water treatment (for example in the temperature range from 70 to 90° C.). For the second stage (post-sealing or main sealing) or for the one-stage process, sealing can be carried out, for example, by boiling with deionized water (for example at temperatures $\geq 95°$ C., pH values in the range from 5.5 to 6, and a treatment duration of from 30 to 60 minutes), or a steam treatment can take place, for example at a superatmospheric pressure from 4 to 6 bar. In accordance with a further procedure, sealing can be carried out in one or two stages, for example at pH values in the range from 4.5 to 8, with the aid of metal salts or oxides (for example nickel acetate or cobalt acetate) or also with chromates. Through such a sealing with metal compounds (for example with nickel acetate), bleeding of the dye can be suppressed particularly well. In accordance with a further procedure, sealing can be carried out with the aid of organic sealants, for example organic phosphonates and diphosphonates or alternatively water-soluble (cyclo) aliphatic polycarboxylic acids or aromatic ortho-hydroxycarboxylic acids (for example as described in DE-A-3327191) for example, at pH values in the range from 4.5 to 8. The sealants can be employed in very low concentrations, for example in concentrations of from 0.00 1 to 2 g/l, preferably from 0.002 to 0.1 g/l. The scaling temperature can vary depending on the auxiliary used and the method selected, for example in the range from 20 to 100° C., for hot sealing for example in the range from 60 to 100° C., advantageously from 80 to 100° C. for cold sealing for example at temperatures in the range from 20 to 30° C., where nickel salts or cobalt salts can be used in combination with alkali metal fluorides, for example NaF, particularly also for cold sealing, for example at from 20 to 30° C. If desired, the dyed and sealed aluminium oxide layer or aluminium alloy oxide layers can be coated subsequently, for example with waxes, resins, oils, paraffins or plastics, provided that this coating is transparent.

In order to set the pH values in the dye baths and sealing solutions, it is possible to use known additives which are conventional per se, for example sulphuric acid, acetic acid, ammonia, sodium hydroxide or carbonate and/or sodium acetate. Optionally, or if necessary, anti-smut additives can be used and/or surfactants (for example wetting agents), in particular anionic surfactants, such as $C_{9-14}$-alkanesulphonates, mono- or dialkylbenzenesulphonates in which the alkyl radicals contain a total of from 4 to 18 carbon atoms, and oligomeric condensation products of formaldehyde and naphthalenesulphonic acids Green to black or gray dyeings which are distinguished by their high levels of fastness, especially light fastnesses (also light fastness when wet and weathering fastness) are obtainable on the said oxide layers on aluminium or aluminium alloys with the dyes of the formula (I), in particular the preferred ones, which contain a total of three sulpho groups, especially those in which B signifies the radical of a coupling component of the formula ($\beta$).

The dyes of the formula (I) in which —B signifies the radical of a coupling component of the formula ($\alpha$) ($\beta$), ($\gamma$), ($\delta$) or ($\eta$) in which $T_1$, signifies —NH$_2$ are suitable for the generation of green dyeings, while those in which —B signifies the radical of a coupling component of the formula ($\epsilon$), ($\zeta$) or ($\eta$) in which $T_1$ signifies —OH are suitable for the generation of dark-green to black or gray dyeings, and those in which —B signifies the radical of a coupling component HB$_4$ are suitable for the generation of violet to black dyeings.

For colouring plastic compositions, it is, in general, possible to use water-soluble plastics or polymers, as otherwise conventionally employed in corresponding coloured preparations, such as, for example, in detergents or in cosmetics. The following may be mentioned principally: polymers and copolymers of ethylenically unsaturated $C_{3-8}$-monocarboxylic acids and optionally $C_{4-8}$dicarboxylic acids, polyalkylene glycols (principally polyethylene glycols) or polyetherurethanes. The mean molecular weights $M_w$ of these polymers can vary in broad ranges, for polycarboxylic acids for example from 5000 to to 5,000,000, advantageously from 50,000 to 200,000, for polyalkylene glycols, in particular polyethylene glycols, for example from 400 to 6000, preferably from 600 to 4000, for polyetherurethanes for example from 10,000 to $10^8$, particularly from $10^5$ to $10^7$.

Particularly worthy of mention are polymers and copolymers which are employed in detergents, principally polycarboxylic acids, in particular (co)polymers of (meth)acrylic acid and optionally maleic acid. The molar ratio of the unsaturated monocarboxylic acids to the unsaturated dicarboxylic acids here is advantageously in the range from 5/5 to 9/1, preferably from 6/4 to 8/2. The unsaturated dicarboxylic acid here is advantageously employed as the anhydride. The polycarboxylic acids are advantageously employed in the form of their alkali metal salts, for example as lithium, sodium or potassium salts, of which sodium salts are preferred.

These polymers, in particular in the form of their alkali metal salts, are water-soluble (i.e. they form, at least under application conditions, true or colloidal solutions in water).

For the production of corresponding dye-containing polymer compositions, the polymers are advantageously mixed in the form of concentrated, aqueous solutions, for example at concentrations in the range from 5 to 80, preferably from 15 to 50% by weight, with a corresponding dye solution, for example having a concentration in the range from 10 to 90, preferably from 20 to 80 % by weight, and optionally with further additives, which is suitable for the respective use and is conventional in the respective area of industry. The mixtures produced in this way can either be used directly or, if desired, dried or granulated, for example to give powder or granules respectively.

A particular subject-matter of the invention is the use of the dyes of the formula (I), particularly the green ones, in detergents, for example as free-flowing, coloured granular material (for example in polymers as mentioned above), which is mixed as coloured specks with non-dye-containing detergent granules or, mixed together with all the detergent components, is either in a liquid detergent or in a detergent granular material.

A suitable composition of a coloured polymer granular material which is suitable as detergent additive and which contains, as polymer, a polycarboxylic acid is one which advantageously contains from 10 to 70, preferably from 20 to 40% by weight of polycarboxylic acid, as sodium salt, and the remainder to 10% by weight (minus x % by weight for the dye) of blend salt, preferably Glauber's salt, and contains an amount x % by weight of dye which is sufficient to impart a distinct colour, preferably in a green shade, to the specks, principally in the range from 0.005 to 0.2% by weight, preferably from 0.01 to 0.1% by weight of dye.

The dyes are present in the detergents in minimal proportions. The weight ratio of coloured specks to the remainder of the detergent is, for example, in the range from 0.01/99.99 to 2/98, preferably in the range from 0.05/99.95 to 1/99. Neither do the dyes to be employed in accordance with the invention have an adverse effect on any optical brighteners which may be present in the detergent, but instead are readily compatible with anionic detergent brighteners. If the detergents are used for cleaning textile goods under the generally alkaline conditions which are produced by the detergent composition, the dye practically does not build up at all or only in a labile manner on the substrate, which means that it can be washed out in the same washing operation or in a subsequent washing or rinsing operation.

A further particular subject-matter of the invention is represented by the water-soluble polymer compositions which are characterized by a content of dye of the formula (I), in particular the free-flowing granular materials.

The preferred dyes of the formula (I), which are also a subject-matter of the invention can also be employed in jet printing inks or for dyeing fibrous substrates, for example wool or leather, by dyeing methods which are conventional per se, for jet ink printing there being preferred those containing more than two sulpho groups, while for dyeing fibrous substrates are preferred those containing only two sulpho groups.

The dyes of the formula (I) are distinguished by very high light fastness of the dyeings produced therewith and also of the compositions coloured or tinted therewith.

In the Examples below, parts are parts by weight and percentages are percent by weight; the temperatures are given in degrees Celsius. The $\lambda_{max}$ values (light absorption maxima) are measured in aqueous. dilute NaOH solution for the absorption maximum in the yellow region ($\lambda_{max1}$) and in tie blue region ($\lambda_{max2}$).

EXAMPLE 1 a) Production of 1-Amino-4-(4'-aminophenylamino) anthraquinone-2,2',5'-trisulphonic Acid 122.25 parts of 1-amino-4-(4'-aminophenylamino)-anthraquinone-2,3'-disulphonic acid are introduced in small portions into 530 parts of sulphuric acid and 280 parts of 25% oleum, during which the temperature rises to 60° C. The mixture is heated at 80° C. for 5 hours with stirring, The resultant mixture is then introduced into a mixture of 1000 parts of water, 1000 parts of ice and 600 parts of sodium chloride. The precipitated product is filtered off and dried. The title compound conforming to the formula

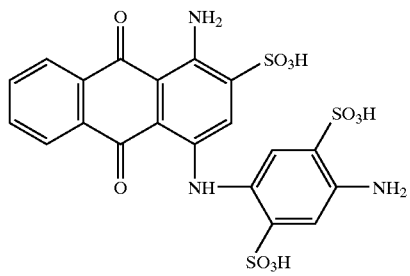

is obtained in good yield.

b) 3.45 parts of sodium nitrite in 8 parts of water are added dropwise to 28.45 parts of the trisulphonic acid produced under a) in 400 parts of water, 200 parts of ice and 1 part of hydrochloric acid. The mixture is allowed to stir for a further 30 minutes at 0° C., and the excess nitrite is then destroyed with a little sulphonic acid. A solution of 8.85 parts of acetoacetanilide in 60 parts of water with 5 parts of 30% sodium hydroxide solution is subsequently added dropwise. The temperature rises to about 10° C. 25 parts of sodium chloride are then added, and the mixture is filtered. The dye, obtained as the sodium salt, conforms, in the form of the free acid, to the formula

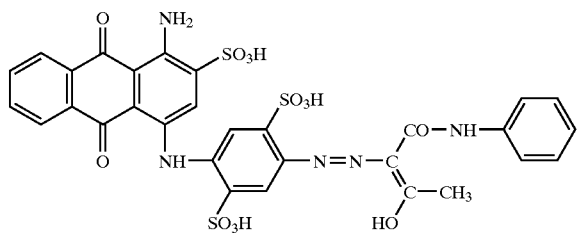

with $\lambda_{max1}$=435 nm and $\lambda_{max2}$=633 nm.

as the sodium salt. It dyes anodized aluminium in green shades. These aluminium dyeings exhibit high light fastness.

EXAMPLE 2

3.45 parts of sodium nitrite in 8 parts of water are added dropwise to 28.45 parts of 1-amino-4-(4'-aminophenylamino)-anthraquinone-2,6,3'-trisulphonic acid in 400 parts of water, 200 parts of ice and 1 part of hydrochloric acid. The mixture is allowed to stir for 30 minutes at 0° C., and the excess nitrite is then destroyed with a little sulphonic acid. A solution of 8.85 parts of acetoacetanilide in 60 parts of water with 5 parts of 30% sodium hydroxide solution is subsequently added dropwise. The temperature rises to about 10° C. 25 parts of sodium chloride are then added, and the mixture is filtered. The dye, obtained as the sodium salt, conforms, in the form of the free acid, to the formula

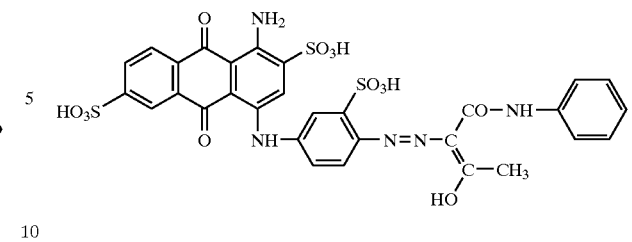

with $\lambda_{max1}$=427 nm and $\lambda_{max2}$=640 nm.

It dyes anodized aluminium in green shades. The aluminium dyeings exhibit high light fastness.

Compounds of the formula (1)

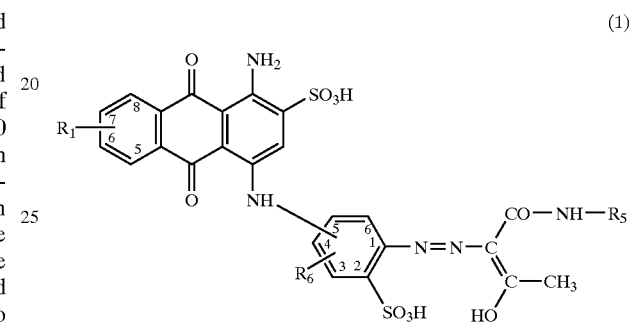

TABLE 1

| Ex. No. | $R_1$ | $R_6$ | —NH— position | $R_5$ | $\lambda_{max\,1}$ nm | $\lambda_{max\,2}$ nm |
|---|---|---|---|---|---|---|
| 3 | 8-SO$_3$H | H | 4 | ![phenyl] | 425 | 636 |
| 4 | H | H | 4 | " | 452 | 738 |
| 5 | 7-SO$_3$H | H | 4 | " | 427 | 645 |
| 6 | 5-SO$_3$H | H | 4 | " | 419 | 634 |
| 7 | 6-Cl | H | 4 | " | | |
| 8 | H | 6-SO$_3$H | 4 | " | | |
| 9 | H | 6-COOH | 4 | " | | |
| 10 | H | 4-SO$_3$H | 5 | " | | |
| 11 | H | H | 5 | " | | |
| 12 | 6-SO$_3$H | H | 4 | 3-SO$_3$H-phenyl | 425 | 643 |
| 13 | H | 5-SO$_3$H | 4 | " | 433 | 628 |
| 14 | H | H | 4 | " | 427 | 632 |
| 15 | 5-SO$_3$H | H | 5 | " | | |
| 16 | H | H | 4 | 2,5-diCH$_3$-4-OCH$_3$-SO$_3$H-phenyl | | |

TABLE 1-continued

| Ex. No. | R₁ | R₆ | —NH— position | R₅ | $\lambda_{max\,1}$ nm | $\lambda_{max\,2}$ nm |
|---|---|---|---|---|---|---|
| 17 | H | 5-SO₃H | 4 | 5-methyl-naphthalene-1-sulfonic acid | 433 | 627 |
| 18 | H | H | 4 | " | 429 | 628 |
| 19 | 6-SO₃H | H | 4 | " | 431 | 643 |
| 20 | H | H | 4 | 4-methyl-naphthalene-1-sulfonic acid | 431 | 628 |
| 21 | H | 5-SO₃H | 4 | " | 429 | 625 |
| 22 | 7-SO₃H | H | 4 | " | 433 | 645 |
| 23 | 5-SO₃H | H | 4 | " | | |
| 24 | H | 6-COOH | 4 | 4-methyl-benzenesulfonic acid | | |
| 25 | H | H | 4 | " | 426 | 628 |
| 26 | H | 5-SO₃H | 4 | " | 425 | 607 |
| 27 | H | 4-SO₃H | 5 | —CH₂—C₆H₅ | | |
| 28 | H | 5-SO₃H | 4 | " | | |
| 29 | H | H | 5 | 2-methyl-methoxybenzene | | |
| 30 | H | 4-SO₃H | 5 | " | | |
| 31 | H | 5-SO₃H | 4 | " | 427 | 612 |
| 32 | H | " | 4 | 2,3-dimethylbenzene | | |
| 33 | H | " | 4 | —CH(CH₃)—CH₂—CH₃ | 417 | 607 |
| 34 | H | 4-CH₃ | 5 | 3-methyl-4-methoxy-benzenesulfonic acid | | |

TABLE 1-continued
| Ex. No. | $R_1$ | $R_6$ | —NH— position | $R_5$ | $\lambda_{max\ 1}$ nm | $\lambda_{max\ 2}$ nm |
|---|---|---|---|---|---|---|
| 35 | 6-SO$_3$H | H | 4 | 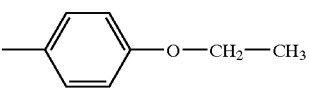 | | |
| 36 | H | 5-SO$_3$H | 4 | 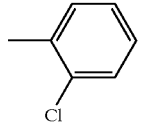 | | |
| 37 | H | " | 4 | —CH$_2$—CH—(CH$_2$)$_3$—CH$_3$<br>　　　　　$\vert$<br>　　　　CH$_2$—CH$_3$ | 418 | 607 |
| 38 | H | " | 4 | 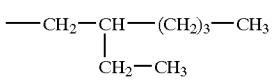 | 426 | 607 |
| 39 | H | 5-SO$_3$H | 4 | 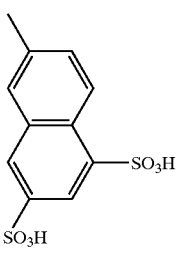 | | |
| 40 | H | " | 4 | 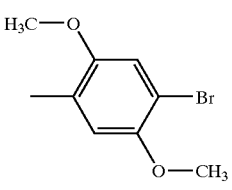 | | |
| 41 | 6-SO$_3$H | H | 4 | " | | |
| 42 | " | H | 4 | 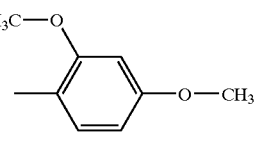 | | |
| 43 | 7-SO$_3$H | H | 5 | " | | |
| 44 | H | 5-SO$_3$H | 4 | 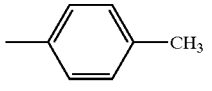 | 429 | 622 |
| 45 | H | " | 4 | 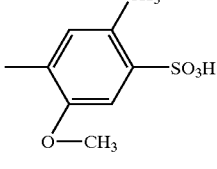 | 425 | 602 |

TABLE 1-continued
| Ex. No. | $R_1$ | $R_6$ | —NH— position | $R_5$ | $\lambda_{max\,1}$ nm | $\lambda_{max\,2}$ nm |
|---|---|---|---|---|---|---|
| 46 | H | " | 4 | 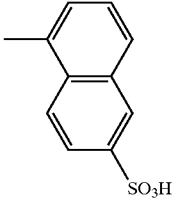 | 432 | 625 |
| 47 | 6-$SO_3H$ | " | 4 | —$C_6H_5$ | | |
| 48 | 7-$SO_3H$ | " | 4 | —$C_6H_5$ | | |
Compounds of the formula
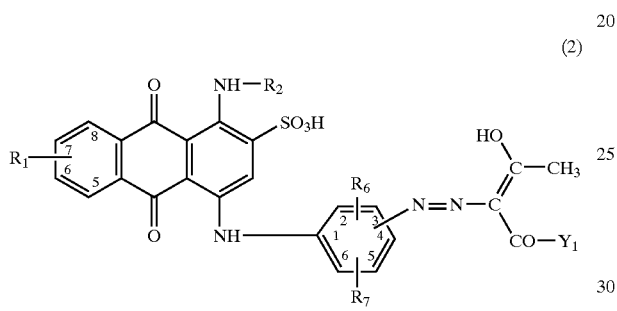
(2)
TABLE 2
| Ex. No. | $R_1$ | $R_2$ | $R_6$ | $R_7$ | $Y_1$ | —N=N— position |
|---|---|---|---|---|---|---|
| 49 | H | $CH_3$ | 3-$SO_3H$ | H | —NH—C₆H₅ | 4 |
| 50 | H | H | " | 6-$SO_3H$ | —NH—C₆H₄—$SO_3H$ | 4 |
| 51 | 7-$SO_3H$ | H | " | H | —NH—C₆H₅ | 4 |
| 52 | H | H | H | 6-$SO_3H$ | —NH—C₆H₄—$SO_3H$ (3-) | 3 |
| 53 | 5-$SO_3H$ | $C_2H_5$ | 3-$OCH_3$ | H | " | 4 |
| 54 | H | H | 2-$OCH_3$ | 5-$CH_3$ | " | 4 |
| 55 | H | H | 4-$CH_3$ | H | —NH—naphthyl(di-$SO_3H$) | 3 |

TABLE 2-continued

| Ex. No. | $R_1$ | $R_2$ | $R_6$ | $R_7$ | $Y_1$ | —N=N— position |
|---|---|---|---|---|---|---|
| 56 | 6-SO$_3$H | H | 3-Cl | H | (4-NH-2-OCH$_3$-5-CH$_3$-phenyl-SO$_3$H) | 4 |
| 57 | H | C$_2$H$_5$ | 3-SO$_3$H | H | —NH—CH$_2$—CH(CH$_2$—CH$_3$)—(CH$_2$)$_3$—CH$_3$ | 4 |
| 58 | H | H | " | H | —N(CH$_3$)(phenyl) | 4 |
| 59 | H | H | 4-SO$_3$H | H | " | 3 |
| 60 | H | CH$_3$ | 2-SO$_3$H | 5-SO$_3$H | —NH-(2-CH$_3$-phenyl) | 4 |
| 61 | H | H | 2-SO$_3$H | 5-SO$_3$H | —N(C$_2$H$_5$)$_2$ | 4 |
| 62 | H | H | " | " | —NH$_2$ | 4 |

Example 50: $\lambda_{max1}$=425 nm, $\lambda_{max2}$=607 nm
Example 51: $\lambda_{max1}$=427 nm, $\lambda_{max2}$=645 nm
Example 61: $\lambda_{max1}$=433 nm, $\lambda_{max2}$=631 nm
Example 62: $\lambda_{max1}$=429 nm, $\lambda_{max2}$=627 nm
Compound of the formula

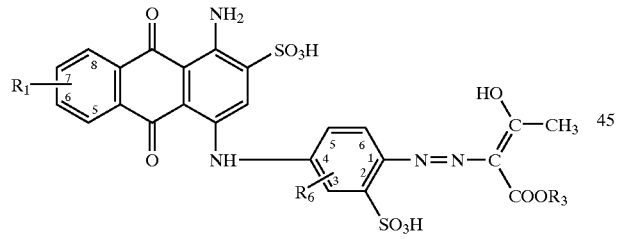

(3)

TABLE 3

| Ex. No. | $R_1$ | $R_6$ | $R_3$ | $\lambda_{max\,1}$ nm | $\lambda_{max\,2}$ nm |
|---|---|---|---|---|---|
| 63 | H | H | —CH$_3$ | 377 | 628 |
| 64 | H | 5-SO$_3$H | —CH$_3$ | 403 | 617 |
| 65 | H | 5-SO$_3$H | —C$_2$H$_5$ | 417 | 610 |
| 66 | H | 5-SO$_3$H | —C$_6$H$_5$ | 401 | 616 |
| 67 | H | 5-SO$_3$H | —C(CH$_3$)$_3$ | 414 | 622 |
| 68 | 6-SO$_3$H | H | —(CH$_2$)$_2$—CH$_3$ | | |
| 69 | 7-SO$_3$H | H | —(CH$_2$)$_3$—CH$_3$ | | |

The compounds of Tables 4–7 below (Examples 70–99) and of Examples 100 to 102 are produced analogously to the details in Examples 1, 2 or respectively 78.

Compounds of the formula

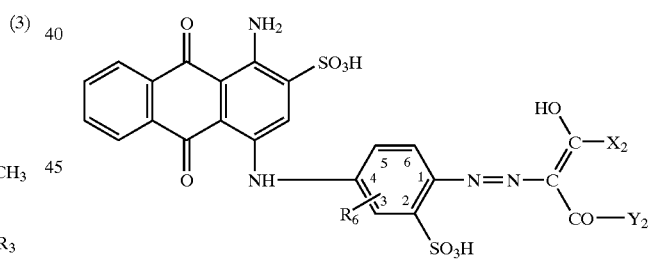

(4)

TABLE 4

| Ex. No. | $R_6$ | $X_2$ | $Y_2$ | $\lambda_{max.\,1}$ nm | $\lambda_{max.\,2}$ nm |
|---|---|---|---|---|---|
| 70 | 5-SO$_3$H | —NH$_2$ | —NH$_2$ | 429 | 629 |
| 71 | 5-SO$_3$H | —OC$_2$H$_5$ | —NH$_2$ | | |
| 72 | 5-SO$_3$H | —OCH$_3$ | —O—CH$_3$ | 338 | 624 |
| 73 | 5-SO$_3$H | —OC$_2$H$_5$ | —O—C$_2$H$_5$ | 339 | 624 |
| 74 | 5-SO$_3$H | —OCH$_3$ | —O—CH$_2$—C$_6$H$_5$ | | |
| 75 | 5-SO$_3$H | —CH$_3$ | —CH$_3$ | 426 | 617 |
| 76 | 5-SO$_3$H | —CH$_3$ | —C$_6$H$_5$ | 433 | 625 |
| 77 | H | —C$_6$H$_5$ | —C$_6$H$_5$ | | |

The dyes of Examples 3–77 dye anodized aluminium in green shades.

EXAMPLE 78

1.5 parts of sodium nitrite in 8 parts of water are added dropwise to 9.8 parts of 1-amino-4-(4'-amino-phenyl)- anthraquinone-2,3'-disulphonic acid in 200 parts of water, 100 parts of ice and 1 part of hydro-chloric acid. The mixture is stirred at 0° C. for a further 30 minutes, the excess nitrite is destroyed with a little sulphonic acid, and a solution of 4.66 parts of 1-ethyl-4-methyl-6-hydroxypyridone-3-sulphonic acid in 20 parts of water with 2 parts of 30% NaOH solution is then added dropwise. During this addition, the pH is held at between 8.5 and 9.5. The dye is precipitated by addition of sodium chloride, filtered off and washed. On anodized aluminium, black dyeings are obtained with this dye, which, in the form of the free acid, conforms to the formula

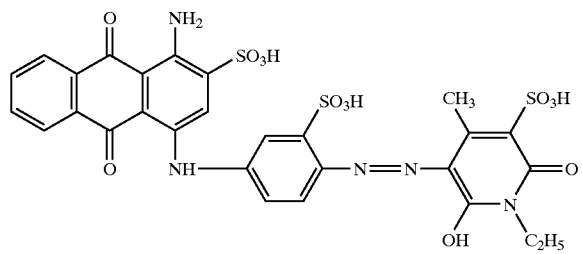

$\lambda_{max1}$=455 nm, $\lambda_{max2}$=622 nm
Compound of the formula

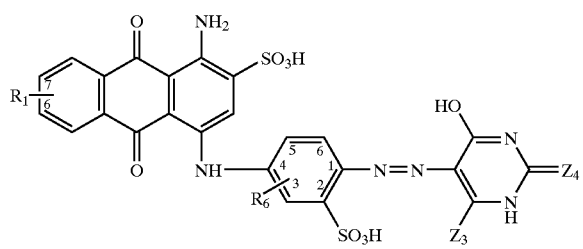

(5)

TABLE 5

| Ex. No. | $R_1$ | $R_6$ | $Z_3$ | $Z_4$ | $\lambda_{max\ 1}$ nm | $\lambda_{max\ 2}$ nm |
|---|---|---|---|---|---|---|
| 79 | H | H | OH | O | 428 | 620 |
| 80 | 6-SO$_3$H | H | OH | O | 432 | 635 |
| 81 | 7-SO$_3$H | H | OH | O | 434 | 638 |
| 82 | H | H | OH | N—C≡N | 443 | 622 |
| 83 | H | 5-SO$_3$H | OH | O | | |
| 84 | H | 5-SO$_3$H | C$_2$H$_5$ | O | | |
| 85 | H | 5-SO$_3$H | NH$_2$ | O | | |

The dyes of Examples 79–85 dye anodized aluminium black.

Compound of the formula

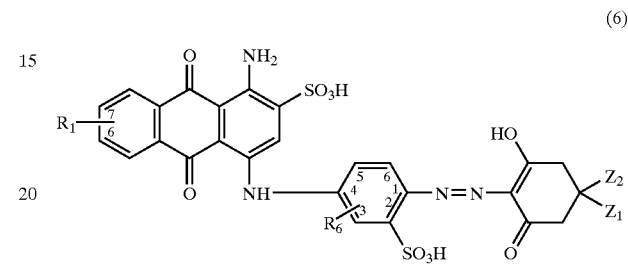

(6)

TABLE 6

| Ex. No. | $R_1$ | $R_6$ | $Z_1$ | $Z_2$ | $\lambda_{max\ 1}$ nm | $\lambda_{max\ 2}$ nm |
|---|---|---|---|---|---|---|
| 86 | H | H | CH$_3$ | CH$_3$ | <400 | 625 |
| 87 | H | 5-SO$_3$H | CH$_3$ | C$_2$H$_5$ | | |
| 88 | 6-SO$_3$H | H | H | H | | |

The dyes of Examples 86–88 dye anodized aluminium in green shades.

The compounds of the following 7$^{th}$ table conform to the formula

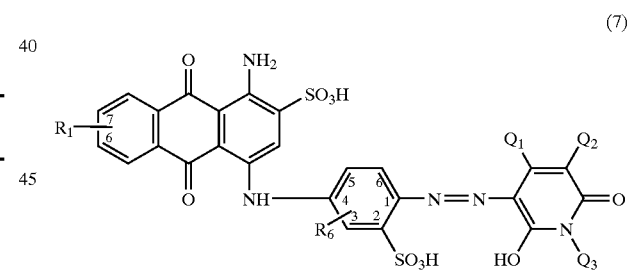

(7)

TABLE 7

| Ex. No. | $R_1$ | $R_6$ | $Q_1$ | $Q_2$ | $Q_3$ | $\lambda_{max\ 1}$ nm | $\lambda_{max.\ 2}$ nm |
|---|---|---|---|---|---|---|---|
| 89 | H | 5-SO$_3$H | CH$_3$ | SO$_3$H | C$_2$H$_5$ | 450 | 613 |
| 90 | H | H | CH$_3$ | H | H | 449 | 648 |
| 91 | H | 5-SO$_3$H | CH$_3$ | H | H | 449 | 617 |
| 92 | H | H | CH$_3$ | —CH$_2$—SO$_3$H | H | 462 | 628 |
| 93 | H | 5-SO$_3$H | CH$_3$ | CN | H | | |
| 94 | 6-SO$_3$H | H | CH$_3$ | CN | n-C$_4$H$_9$ | | |
| 95 | 7-SO$_3$H | H | CH$_3$ | —CH$_2$—SO$_3$H | C$_2$H$_5$ | | |
| 96 | H | 5-SO$_3$H | CH$_3$ | —CH—CH(CH$_3$)$_2$<br>    \|<br>    SO$_3$H | H | | |
| 97 | H | 5-SO$_3$H | CH$_3$ | CONH$_2$ | C$_2$H$_5$ | | |

TABLE 7-continued

| Ex. No. | $R_1$ | $R_6$ | $Q_1$ | $Q_2$ | $Q_3$ | $\lambda_{max\,1}$ nm | $\lambda_{max.\,2}$ nm |
|---|---|---|---|---|---|---|---|
| 98 | H | H | $CH_3$ | H | $-CH_2-CH_2-SO_3H$ | | |
| 99 | H | H | $-CH_2-SO_3H$ | $SO_3H$ | $C_2H_5$ | | |

The dyes of Examples 89–99 dye anodized aluminium black.

EXAMPLE 100

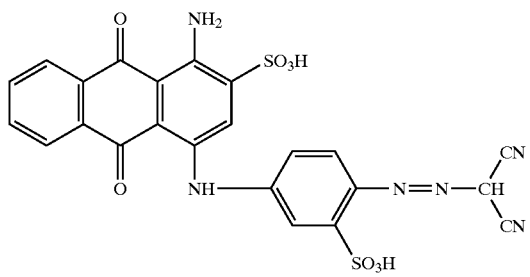

$\lambda_{max1}$=414 nm; $\lambda_{max2}$=630 nm.

EXAMPLE 101

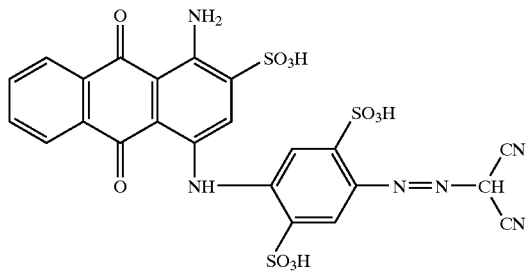

$\lambda_{max1}$=423 nm; $\lambda_{max2}$=625 nm.

EXAMPLE 102

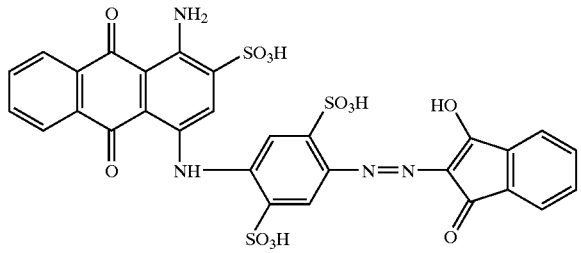

$\lambda_{max2}$=616 nm.

The dyes of Examples 100 to 102 dye anodized aluminium in green shades.

The dyes of the following Table 8 conform to the formula (8)

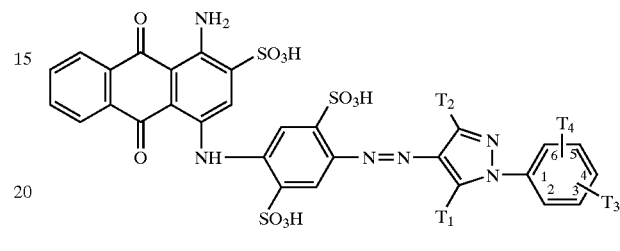

TABLE 8

| Ex. No. | $T_1$ | $T_2$ | $T_3$ | $T_4$ | $\lambda_{max.\,1}$ nm | $\lambda_{max\,2}$ nm |
|---|---|---|---|---|---|---|
| 103 | $-NH_2$ | $-CH_3$ | 4-$SO_3H$ | H | 450.5 | 608 |
| 104 | " | " | 2-$SO_3H$ | 4-O—$CH_3$ | 450 | 612 |
| 105 | " | " | 3-$SO_3H$ | H | 450 | 607 |
| 106 | $-OH$ | " | H | H | 440 | 620 |
| 107 | " | $-CH_2-SO_3H$ | H | H | 442 | 616 |
| 108 | " | $-C_6H_5$ | 2-$SO_3H$ | H | 446.3 | 618 |
| 109 | " | " | 4-$SO_3H$ | H | 440 | 616 |
| 110 | " | $-CH_3$ | 4-$SO_3H$ | H | | |

The dyes of Examples 103–105 dye anodized aluminium in green shades, and those of Examples 106–110 dye it black.

The dyes of the following Table 9 conform to the formula (9)

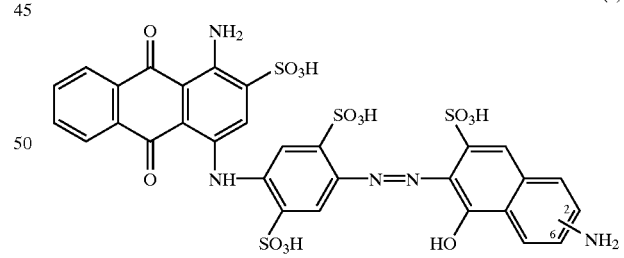

TABLE 9

| Ex. No. | Position of the $NH_2$ group | $\lambda_{max.\,1}$ nm | $\lambda_{max.\,2}$ nm |
|---|---|---|---|
| 111 | 7 | 515 | 619.3 |
| 112 | 6 | | 622.2 | the dye of Example 111 dyes anodized aluminium black, and that of Example 112 dyes it reddish blue.

APPLICATION EXAMPLE A

A degreased and deoxidized workpiece of pure aluminium is anodically oxidized for 40–50 minutes with direct current at a temperature of 18–20° C., a voltage of 15–16 volts and a current density of 1.5 A/dm² in an aqueous solution containing 18–22 parts of sulphuric acid and 1.2–7.5 parts of aluminium sulphate per 100 parts. An oxide layer with a thickness of about 20–24 µm is formed. After rinsing with water, the anodized aluminium sheet is dyed for 15 minutes at 60° C. in a solution consisting of 0.5 parts of the dye according to Example 1 in 1000 parts of deionized water whose pH has been adjusted to 5.5 with acetic acid and sodium acetate. After rinsing in water, the dyed aluminium sheet is sealed at 98–100° C. for 40–50 minutes in deionized water. A pure-green dyeing of good heat resistance and very good light fastness is obtained.

APPLICATION EXAMPLE B

The procedure is as described in Application Example A, with the difference that the post-treatment is carried out in a solution of 3 parts of nickel acetate in 1000 parts of water under otherwise identical conditions. A pure-green dyeing of good heat resistance and very good light fastness is obtained.

APPLICATION EXAMPLE C 10 parts of the dye from Example 1 are dissolved in 500 parts of water and stirred into a highly viscous solution consisting of 400 parts of water and 100 parts of methyl-Cellosolve having a mean degree of polymerization and a degree of substitution of 1.5. The printing ink obtained in this way is applied by screen printing to a dry, oxidized aluminium sheet obtained by anodizing an aluminium alloy of the Al/Mg/Si 0.5 type for 30 minutes in a solution of 100 parts of chromic anhydride in 1000 parts of water at 53° C. and a current density of 1.2 A/dm². The printed sheet is dipped into boiling water for 10 minutes and rinsed well with cold water. A green pattern on a weakly grayish background is obtained.

The dyes of Examples 2–112 are employed in Application Examples A, B and C analogously to the dye of Example 1, giving in each case green or black dyeings.

APPLICATION EXAMPLE D 100 parts of a 40% solution of a copolymer of acrylic acid and maleic acid in the molar ratio 7/3, with a mean molecular weight $M_w$=70,000, as the sodium salt, are mixed with 120 parts of Glauber's salt and with 0.03 parts of the dye produced in accordance with Example 45, and the resultant composition is extruded and granulated in an extrusion compacter/granulator (particle size in the range from 0.3 to 2 mm). The resultant granular material is green and can be used as green-coloured specks for detergent granules. A detergent having the composition according to EMPA Article No. 602 (phosphate-free detergent, IEC reference detergent Type A), for example, is suitable for this purpose, 99.5 parts of detergent having the same particle size are mixed with 0.5 parts of the green-coloured specks.

The dyes of Examples 13, 44, 103, 104 or 105 are employed analogously in place of the dye of Example 45.

What is claimed is:

1. A method for dyeing or colouring non-fibrous substrates comprising the steps of:
    providing a non-fibrous substrate; and
    contacting said non-fibrous substrate with a water-soluble dyes of the formula

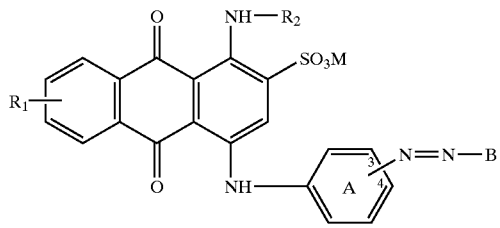

(I), in which
    $R_1$ is hydrogen, hydroxyl, $C_{1-4}$-alkyl, $C_{1-4}$-alkoxy, halogen or $SO_3M$,
    $R_2$ is hydrogen, $C_{1-4}$-alkyl or $C_{3-6}$-cycloalkyl,
    B is the radical of a carbocyclic, heterocyclic or methylene-active non-cyclic coupling component having at most two optionally fused carbocyclic rings, and
    M is hydrogen or a non-chromophoric cation,
    the ring A has no further substituents or is substituted by from one to four substituents from the series: $C_{1-4}$-alkyl, $C_{1-4}$-alkoxy, halogen, —$NO_2$, —COOM and —$SO_3M$, and the group —N=N—B is bonded to position 3 or 4 of the ring A, with the proviso that the molecule contains at least two —$SO_3M$ groups.

2. A method for dyeing or colouring non-fibrous substrates according to claim 1, characterized in that B is the radical of a coupling component $HB_1$, $HB_2$, $HB_3$ or $HB_4$, in which
    $HB_1$ is a methylene-active, non-cyclic coupling component in which any carbocyclic rings which may be present are unsubstituted or substituted with one or more of the substituents $C_{1-4}$-alkyl, $C_{1-4}$-alkoxy, halogen and —$SO_3M$;
    $HB_2$ is a methylene-active, carbocyclic non-aromatic coupling component;
    $HB_3$ is a heterocyclic coupling component in which any carbocyclic rings which may be present are unsubstituted or substituted with one or more of the substituents $C_{1-4}$-alkyl, $C_{1-4}$-alkoxy, halogen and —$SO_3M$; and
    $HB_4$ is a coupling component of the formula

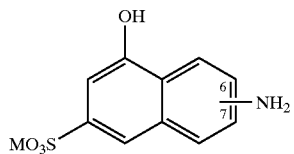

in which the amino group is bonded to position 6 or 7 of the naphthalene radical.

3. A method for dyeing or colouring non-fibrous substrates according to claim 1 wherein said non-fibrous substrates are anodized aluminium or plastic coatings or plastic compositions.

4. A method for dyeing or colouring non-fibrous substrates according to claim 2 wherein said non-fibrous substrates are anodized aluminium or plastic coatings or plastic compositions.

5. A method for dyeing or colouring non-fibrous substrates according to claim 3 for the production of coloured plastic compositions in which the plastic is a water-soluble polymer.

6. A method for dyeing or colouring non-fibrous substrates according to claim 5 for colouring free-flowing bulk material.

7. A method for dyeing or colouring non-fibrous substrates according to claim 6 of green dyes of the formula (I) having at least three sulpho groups for the production of coloured specks for detergent granules.

8. The monoazo dyes of the formula (I'),

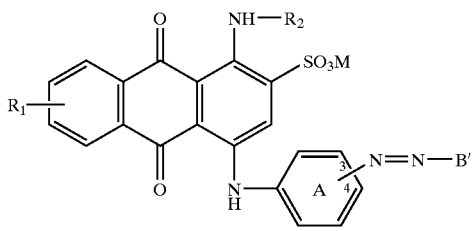

(I')

in which
- $R_1$ is hydrogen, hydroxyl, $C_{1-4}$-alkyl, $C_{1-4}$-alkoxy, halogen or $SO_3M$,
- $R_2$ is hydrogen, $C_{1-4}$-alkyl or $C_{3-5}$-cycloalkyl,
- B' is the radical of a coupling component $HB_1$, $HB_2$, or $HB_4$, in which
  - $HB_1$ is a methylene-active, non-cyclic coupling component in which any carbocyclic rings which may be present are unsubstituted or substituted with one or more of the substituents $C_{1-4}$-alkyl, $C_{1-4}$-alkoxy, halogen and $—SO_3M$;
  - $HB_2$ is a methylene-active, carbocyclic non-aromatic coupling component;
  - $HB_4$ is a coupling component of the formula;

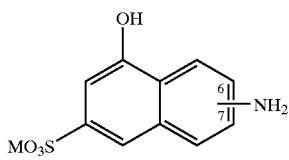

and M is hydrogen or a non-chromophoric cation, the ring A has no further substituents or is substituted by from one to four substituents from the series: $C_{1-4}$-alkyl, $C_{1-4}$-alkoxy, halogen, $—NO_2$, $—COOM$ and $—SO_3M$, and the group $—N=N—B$ is bonded to position 3 or 4 of the ring A, with the proviso that the molecule contains at least two $—SO_3M$ groups.

9. A process for preparing monoazo dyes of the formula (I') according to claim 8, comprising the steps of:
coupling at least one amine of the formula

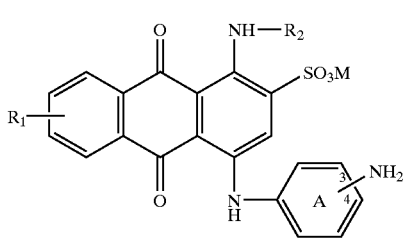

(II)

to at least one coupling component $HB_1$, $HB_2$, or $HB_4$, or reacting a compound of the formula

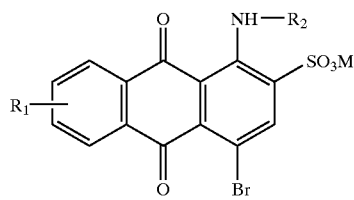

(IV)

with a compound of the formula

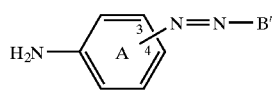

(V').

in which B' is the radical of a coupling component $HB_1$, $HB_2$, or $HB_4$.

10. Coloured plastic compositions in which the plastic is a water-soluble polymer which has been coloured with at least one dye of the formula (I), defined as in claim 1.

11. Coloured plastic compositions in which the plastic is a water-soluble polymer, which has been coloured with at least one dye of the formula (I), according to claim 8.

12. A method for dyeing or colouring non-fibrous substrates comprising the steps of:
providing a non-fibrous substrate: and
contacting said non-fibrous substrate with a water-soluble dyes according to claim 8.

13. Jet printing inks, which contain the monoazo dyes of claim 8.

14. The monoazo dyes of the formula (Ia),

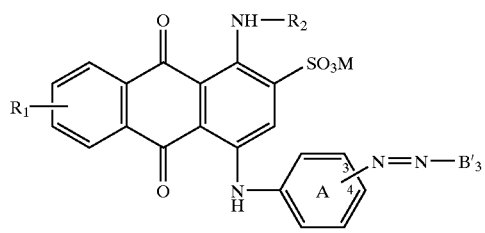

(Ia), in which
- $R_1$ is hydrogen, hydroxyl, $C_{1-4}$-alkyl, $C_{1-4}$-alkoxy, halogen or $SO_3M$,
- $R_2$ is hydrogen, $C_{1-4}$-alkyl or $C_{3-6}$-cycloalkyl,
- $B'_3$ is the radical of a coupling component $HB'_3$, of formula

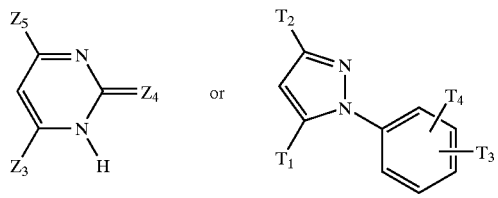

in which
$Z_3$ signifies $—OH$, $—NH_2$, methyl or ethyl,
$Z_4$ signifies $=O$, $=S$, $=NH$ or $=N—CN$, $Z_5$ signifies —OH or —$NH_2$, $T_1$ signifies —OH or —$NH_2$, $T_2$ signifies $C_{1-2}$-alkyl, phenyl, sulphomethyl or —COOM, $T_3$ signifies hydrogen, chlorine, $C_{1-4}$-alkyl, $C_{1-4}$-alkoxy or —$SO_3M$ and $T_4$ signifies hydrogen, $C_{1-4}$-alkyl, $C_{1-4}$-alkoxy or —$SO_3M$, and M is hydrogen or a non-chromophoric cation, the ring A has no further substituents or is substituted by from one to four substituents from the series: $C_{1-4}$-alkyl, $C_{1-4}$-alkoxy, halogen, —$NO_2$, —COOM and —$SO_3M$, and the group —N=N—B is bonded to position 3 or 4 of the ring A, with the proviso that the molecule contains at least two —$SO_3M$ groups.

15. The monoazo dyes of the formula (Ib),

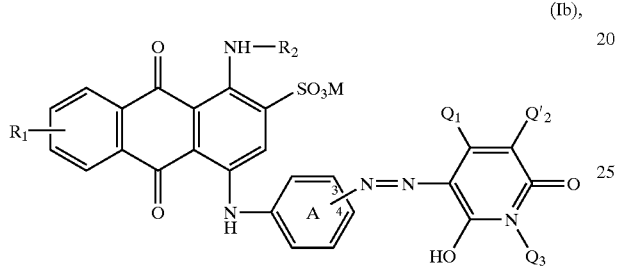

(Ib), in which $R_1$ is hydrogen, hydroxyl, $C_4$-alkyl, $C_{1-4}$-alkoxy, halogen or $SO_3M$, $R_2$ is hydrogen, $C_{1-4}$-alkyl or $C_{3-6}$-cycloalkyl, $Q_1$ signifies $C_{1-4}$-alkyl, —$CH_2$-$SO_3M$, —COOM or phenyl, which optionally carries an —$SO_3M$ group, $Q'_2$ signifies hydrogen, —$CH_2SO_3M$, —$CONH_2$, —$SO_3M$, or $C_{1-4}$-alkyl which is optionally monosubstituted with hydroxyl, halogen, cyano, $C_{1-4}$-alkoxy, —$SO_3M$ or —$OSO_3M$, $Q_3$ signifies hydrogen, $C_{1-6}$-alkyl, substituted $C_{1-6}$-alkyl, cyclohexyl, phenyl or phenyl-($C_{1-4}$-alkyl), and M is hydrogen or a non-chromophoric cation, the ring A has no further substituents or is substituted by from one to four substituents from the series: $C_{1-4}$-alkyl, $C_{1-4}$-alkoxy, halogen, —$NO_2$, —COOM and —$SO_3M$, and the azo group is bonded to position 3 or 4 of the ring A, with the proviso that the molecule contains at least two —$SO_3M$ groups.

16. The monoazo dyes of the formula (Ic),

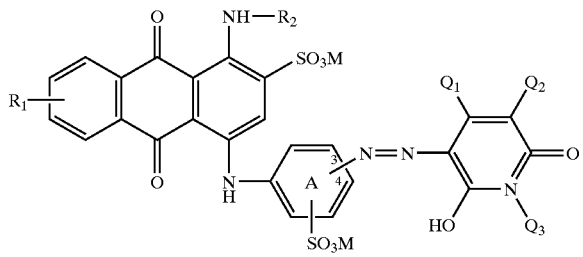

(Ic), in which $R_1$ is hydrogen, hydroxyl, $C_{1-4}$-alkyl, $C_{1-4}$-alkoxy, halogen or $SO_3M$, $R_2$ is hydrogen, $C_{1-4}$-alkyl or $C_{3-6}$-cycloalkyl, $Q_1$ signifies $C_{1-4}$-alkyl, —$CH_2$—$SO_3M$, —COOM or phenyl, which optionally carries an —$SO_3M$ group, $Q_2$ signifies hydrogen, —$CH_2$—$SO_3M$, cyano, —$CONH_2$, —$SO_3M$, or $C_{1-4}$-alkyl which is optionally monosubstituted with hydroxyl, halogen, cyano, $C_{1-4}$-alkoxy, —$SO_3M$ or —$OSO_3M$, $Q_3$ signifies hydrogen, $C_{1-6}$-alkyl, substituted $C_{1-6}$-alkyl, cyclohexyl, phenyl or phenyl-($C_{1-4}$-alkyl), and M is hydrogen or a non-chromophoric cation, the ring A has no further substituents or is substituted by from one to three substituents from the series: $C_{1-4}$-alkyl, $C_{1-4}$-alkoxy, halogen, —$NO_2$, —COOM and —$SO_3M$, and the azo group is bonded to position 3 or 4 of the ring A.

17. A monoazo dye according to claim 15, wherein ring A contains one substituent which is a sulfo group and either no further substituent or one further substituent which is also a sulfo group.

18. A monoazo dye according to claim 16, wherein ring A contains one substituent which is a sulfo group and either no further substituent or one further substituent which is also a sulfo group.

* * * * *